(12) United States Patent
Hosoda et al.

(10) Patent No.: US 8,125,875 B2
(45) Date of Patent: Feb. 28, 2012

(54) OPTICAL PICKUP

(75) Inventors: Ryozo Hosoda, Osaka (JP); Tatsuya Ito, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 661 days.

(21) Appl. No.: 12/292,022

(22) Filed: Nov. 10, 2008

(65) Prior Publication Data
US 2009/0122662 A1 May 14, 2009

(30) Foreign Application Priority Data
Nov. 9, 2007 (JP) .................... 2007-291510

(51) Int. Cl.
*G11B 7/135* (2006.01)
*G02B 7/02* (2006.01)

(52) U.S. Cl. ............ 369/112.23; 720/600; 359/823

(58) Field of Classification Search .......... 720/600, 720/665, 681; 369/53.17, 44.23, 112.23; 359/823
See application file for complete search history.

(56) References Cited

U.S. PATENT DOCUMENTS
2006/0002278 A1* 1/2006 Kitazawa ............. 369/112.01

FOREIGN PATENT DOCUMENTS

| JP | 06-309604 | 11/1994 |
|----|-----------|---------|
| JP | 09-154271 | 6/1997 |
| JP | 10-326430 | 12/1998 |
| JP | 2000-358350 | 12/2000 |
| JP | 2003-045068 A | 2/2003 |
| JP | 2007018680 A | 1/2007 |
| JP | 2007-265597 | 10/2007 |
| JP | 2007-287281 | 11/2007 |

OTHER PUBLICATIONS

Decision of Rejection dated Nov. 15, 2011 for a corresponding Japanese patent application.

* cited by examiner

*Primary Examiner* — Huan Hoang
(74) *Attorney, Agent, or Firm* — Morgan, Lewis & Bockius LLP (57) ABSTRACT

A spherical aberration correction mechanism includes an aberration correction lens, a movable portion for supporting the aberration correction lens, a fixing portion for supporting the aberration correction lens, in which the movable portion is disposed in a slidable manner, a shaft for supporting the movable portion in a rotatable manner about the axis and in a slidable manner in the axial direction, a feed screw having a helical groove, an engaging portion having an engaging groove like a male thread engaging with the helical groove from an direction, and a coil spring engaging with the outer surface of the shaft, for pressing the movable portion in the axial direction. Each end portion of the feed screw is provided with a cylindrical portion having an outer diameter smaller than an inner diameter of the feed screw, and a resetting elastic portion supported by the fixing portion or the movable portion is provided for pressing the movable portion in the direction opposite to the pressing direction of the coil spring.

23 Claims, 8 Drawing Sheets

Plan View

Front View

OPTICAL PICKUP

This application is based on Japanese Patent Application No. 2007-291510 filed on Nov. 9, 2007, and the contents of which are hereby incorporated by reference.

BACKGROUND OF THE INVENTION

1. Field of the Invention

The present invention relates to an optical pickup equipped with an aberration correction mechanism for correcting spherical aberration.

2. Description of Related Art

An optical disc apparatus performs recording or reproduction of information by projecting a laser beam from an optical pickup to an optical disc as a recording medium. A groove called a track is formed on a recording surface of the optical disc. The optical pickup condenses the laser beam to be a laser spot on the track or receives the laser beam reflected by the track so that the information is recorded or reproduced.

A width of the track on a compact disc (CD) medium is different from that on a digital versatile disc (DVD) medium having larger record information quantity than the CD medium, so a diameter of the laser spot when information is recorded or reproduced is also different between them. The laser spot has a circular shape having a diameter that is proportional to a wavelength of the laser beam and is inversely proportional to a numerical aperture (NA) of the objective lens.

Recently a BD (Blu-ray Disc) medium came on the market, which has record information quantity larger than that of the DVD medium. The BD medium has a track width smaller than that of the DVD medium, and a diameter of the laser spot for the BD medium should also be smaller than that for the DVD medium. Therefore, a laser beam of blue violet color having a wavelength (of approximately 405 nm) shorter than that of the laser beam for DVD is used for recording or reproducing information on a BD medium. In addition, although the NA of the objective lens for DVD is approximately 0.6, an objective lens having higher NA that is approximately 0.85 is used.

The spherical aberration of the objective lens increases in a proportional manner to a biquadrate of the NA of the objective lens and a thickness of a transparent layer of the optical disc. Therefore, there is a problem that if the NA of the objective lens is increased so as to decrease a diameter of the laser spot, the spherical aberration will become larger than the case of using an objective lens having a smaller NA. For instance, comparing the objective lens for DVD (NA=0.6) with the objective lens for BD (NA=0.85), quantity of spherical aberration becomes four times larger in case of using the objective lens for BD than in case of using the objective lens for DVD.

If the spherical aberration increases, the laser spot will be blurred, and intensity of light at the midmost decreases. If the spot becomes blurred, it is difficult to project the laser beam onto the track correctly and to read information recorded on the recording surface. In addition, if the intensity of light at the midmost decreases, it becomes difficult to record information. Since the laser beam emitted from the light source is increased for securing the recording, it becomes difficult to record on a small area (track). In addition, a cover layer of the optical disc has a standardized thickness, but an actual thickness of the cover layer through which the laser beam passes is not uniform due to a manufacturing error or a wobbling of the disk. A variation of the thickness of the cover layer also causes a variation of the quantity of spherical aberration.

Therefore, a spherical aberration correction mechanism is used, in which an aberration correction lens is moved before the objective lens so that the spherical aberration can be corrected. This spherical aberration correction mechanism for correcting the spherical aberration includes a movable portion for supporting a plurality of aberration correction lenses in a movable manner in the optical axis direction of the laser beam, a feed screw having a helical groove on the outer surface disposed in parallel with the optical axis of the laser beam and an engaging portion for engaging with the feed screw. The engaging portion is made to engage with the feed screw. In this state the feed screw is driven by an electric motor to rotate so that the engaging portion moves linearly in the direction along the center axis of the feed screw. Thus, the aberration correction lenses supported by the movable portion can be driven to slide in the optical axis direction of the laser beam. When the aberration correction lenses are moved to slide so that a distance between the aberration correction lenses is adjusted, the spherical aberration is corrected. Thus, the spherical aberration generated when the laser beam passes through the transparent layer of the optical disc can be reduced when it passes through the objective lens.

The conventional optical pickup uses a drive mechanism of the movable portion, which includes the engaging portion with teeth having protrusions so that the teeth can engage with the helical groove of the feed screw. In this drive mechanism, the engaging portion is pressed by a leaf spring to the feed screw in the radial direction of the feed screw so that the teeth and the feed screw are engaged with each other without a gap. In this way, the teeth are pressed to the feed screw continuously so as to suppress an occurrence of a so-called backlash that is a timing difference between rotation of the feed screw and an action of the teeth when the teeth are pressed by the rotation of the feed screw. Thus, when the feed screw rotates, a knife edge also moves to slide so that the movable portion can be moved to a correct position in a short time (see JP-A-2003-45068, JP-A-2007-18680 and the like).

In addition, there is another optical pickup recently, in which a lead nut engaging with the feed screw is used for the lens driving portion of the spherical aberration correction mechanism instead of the teeth. In this case where the lead nut engages with the feed screw, there are merits compared with the one using the teeth, which include stable accuracy of positioning in the normal operation, little dropout of engagement, high productivity of the teeth shape of the component and the like.

However, in the case of the one using the lead nut as the drive mechanism of the movable portion, electric power may be supplied to the drive motor continuously after the lead nut reaches the end portion of the feed screw. If the feed screw is driven to rotate continuously, the screw thread of the lead nut and the screw thread of the feed screw may be seized up with each other so that they cannot be reset to the initial state even if the feed screw is moved in the opposite direction by the drive motor.

Furthermore, some of the conventional optical pickups include a cushioning member made of urethane foam or the like disposed at a motion limit of the movable portion. However, it can relieve an impact due to a collision but cannot prevent occurrence of the seizing up and the malfunction of being unable to reset after the seizing up.

SUMMARY OF THE INVENTION

It is an object of the present invention to provide an optical pickup equipped with a spherical aberration correction mechanism having a simple structure, which can suppress occurrence of seizing up malfunction between a lead nut and a feed screw provided to the spherical aberration mechanism.

It is another object of the present invention to provide an optical pickup that can reset the spherical aberration correction mechanism from an abnormal state to a normal state automatically, so that accuracy in recording or reproducing information on an optical disc can be maintained to be high.

An optical pickup according to an embodiment of the present invention includes an objective lens for condensing a light beam emitted from a light source onto a recording surface of an information recording medium, a plurality of aberration correction lenses for correcting spherical aberration of the light beam condensed onto the recording surface by the objective lens, a movable portion for supporting at least one of the plurality of aberration correction lenses, a fixing portion for supporting the aberration correction lens other than the one supported by the movable portion, the movable portion being disposed in the fixing portion in a slidable manner, a shaft disposed in parallel with the optical axis of the aberration correction lens in the fixing portion for supporting the movable portion in a rotatable manner about the axis and in a slidable manner in the axial direction, a feed screw having a helical groove, disposed in parallel with the optical axis of the plurality of aberration correction lenses, an engaging portion disposed in the movable portion, having an engaging groove like a male thread engaging with the helical groove of the feed screw, and a coil spring engaging with the outer surface of the shaft, for pressing the movable portion in the axial direction. each end portion of the feed screw is provided with a cylindrical portion without the helical groove, and a resetting elastic portion for pressing the movable portion in the direction opposite to the pressing direction of the coil spring.

According to this structure, when the movable portion moves beyond the limit of its movable range, the engagement between the engaging groove of the engaging portion and the helical groove of the feed screw is detached, so that the engaging groove of the engaging portion moves to the cylindrical portion. Therefore, even if the feed screw continues to rotate in the state where the movable portion is beyond the limit of its movable range, it is possible to suppress the seizing up between the engaging groove and the helical groove.

In addition, when the feed screw is reactivated after the movable portion moves beyond the limit of its movable range, the resetting elastic portion presses so that the engaging groove and the helical groove are engaged with each other automatically to be reset to the normal state.

Thus, after occurrence of a malfunction in which the movable portion moves beyond the limit of its movable range, it is not necessary to disassemble for reset or to prepare a driving source capable of generating a large torque for releasing the seizing up. Therefore, reliability can be improved, and a simple structure can be realized.

In a preferred embodiment of the present invention, the resetting elastic portion is disposed so as to press the movable portion when the engaging groove of the engaging portion reaches the cylindrical portion.

In another preferred embodiment of the present invention, the resetting elastic portion is supported by the fixing portion. Alternatively, the resetting elastic portion is supported by the engaging portion.

In still another preferred embodiment of the present invention, the engaging portion includes a through hole that the feed screw penetrates in a noncontact manner and a lead nut fixed to the engaging portion, and the lead nut has an engaging groove like a male thread engaging with a helical groove of the feed screw.

In still another preferred embodiment of the present invention, the resetting elastic portion is a leaf spring or a coil spring.

In still another preferred embodiment of the present invention, the feed screw penetrates the middle of the resetting elastic portion, which presses the engaging portion.

DETAILED DESCRIPTION OF THE PREFERRED EMBODIMENTS

Figure 1:
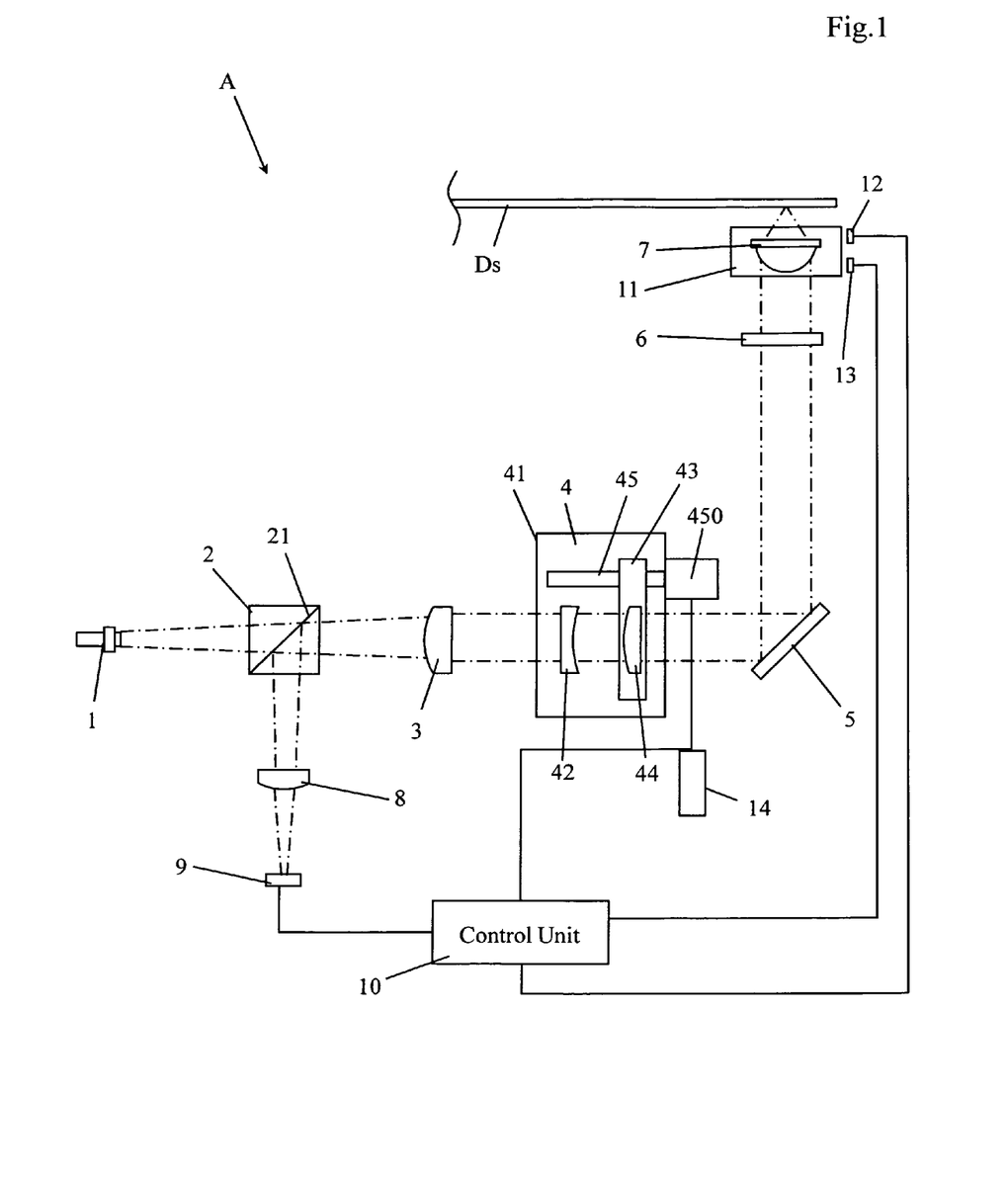
FIG. 1 is a structural diagram of an optical system of an optical pickup according to the present invention.

Hereinafter, an embodiment of the present invention will be described with reference to the attached drawings. FIG. 1 is a structural diagram of an optical system of an optical pickup according to the present invention. The optical pickup shown in FIG. 1 is an optical pickup for BD that uses a blue violet laser for recording or reproducing information.

The optical pickup A shown in FIG. 1 includes at least a laser light source 1, polarizing beam splitter 2, a collimator lens 3, a spherical aberration correction mechanism 4, an upstand mirror 5, a quarter wave length plate 6, an objective lens 7, a sensor lens 8 and a photodetector 9.

The laser light source 1 is a semiconductor laser light source emitting a blue violet laser beam having a wavelength of 405 nm although this is not a limitation. The laser beam emitted from the laser light source 1 is a point light source, and the laser beam emitted from the laser light source 1 is diverging light.

The polarizing beam splitter 2 has a reflection plane 21 inside, and the reflection plane 21 can pass the laser beam or reflect the same in accordance with a polarizing direction of the incident laser beam. The collimator lens 3 is a lens for converting the diverging light into parallel rays and converting the parallel rays into converging light. The laser beam is converted from diverging light into parallel rays when it passes through the collimator lens 3.

Figure 2:
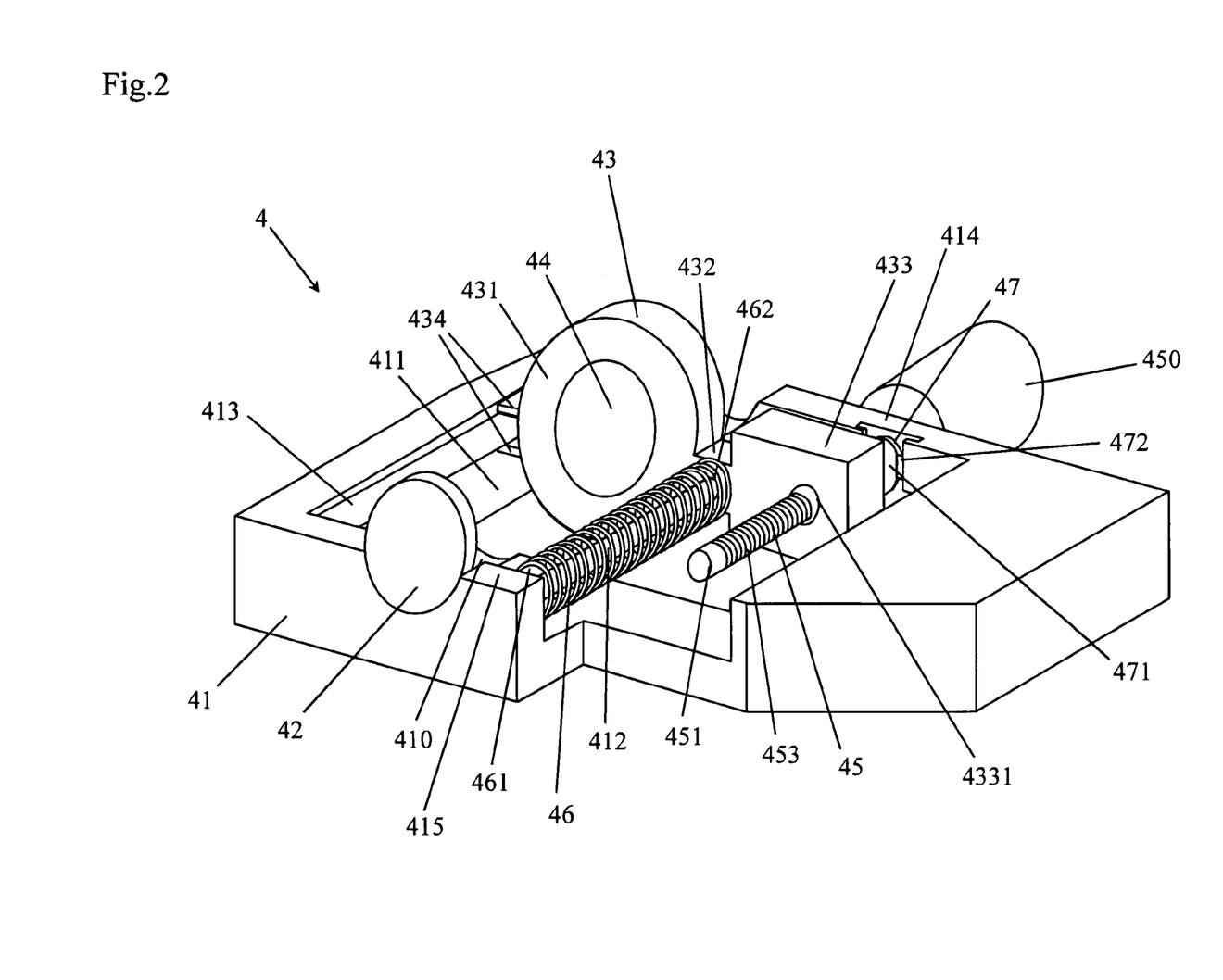
FIG. 2 is a perspective view of a spherical aberration correction mechanism provided to the optical pickup according to the present invention.

Although details of the spherical aberration correction mechanism 4 will be described later, it includes an aberration correction expanding lens 42, an aberration correction collimator lens 44, a feed screw 45 and a drive motor 450 for driving the feed screw 45 as shown in FIG. 2. A gap between the aberration correction expanding lens 42 and the aberration correction collimator lens 44 is adjusted to an appropriate quantity, and the laser beam passes through the aberration correction expanding lens 42 and the aberration correction collimator lens 44 successively so that the spherical aberration can be corrected. The upstand mirror 5 reflects the laser beam so as to bend its propagating direction by 90 degrees. The upstand mirror 5 is disposed in such a manner that the laser beam is reflected by the upstand mirror 5 so that the optical axis thereof becomes perpendicular to the recording surface of the optical disc Ds.

The quarter wave length plate 6 is an optical member for converting linear polarization of the passing laser beam into circular polarization and converting circular polarization into linear polarization. The objective lens 7 is a lens for condensing the laser beam. When the laser beam passes through the objective lens 7, it is condensed so as to form a beam spot on the recording surface of the optical disc Ds. This beam spot is projected onto the track formed on the recording surface of the optical disc Ds. The laser beam is reflected by the recording surface of the optical disc Ds. The objective lens 7 has a numerical aperture (NA) of 0.85 though this is not a limitation.

The sensor lens 8 is a lens for providing the incident laser beam with astigmatic aberration and is used for correcting focus or the like. As the sensor lens 8, a cylindrical lens having an elliptical cross section can be used, for instance. The photodetector 9 has a sensor capable of measuring intensity of the incident laser beam. As a sensor of the photodetector 9, one using a photoelectric element can be used.

Hereinafter, a procedure for reading information recorded on the optical disc by using the optical pickup will be described. First, the laser beam emitted from the laser light source 1 enters the polarizing beam splitter 2. The laser beam emitted from the laser light source 1 is linear polarization light, and its polarizing direction is the direction of passing through the reflection plane of the polarizing beam splitter 2. Therefore, the laser beam passes through the reflection plane 21 of the polarizing beam splitter 2. The laser beam that has passed through the polarizing beam splitter 2 is converted from the diverging light into parallel rays when it passes through the collimator lens 3.

The laser beam that has passed through the collimator lens 3 passes through the spherical aberration correction mechanism 4. On this occasion, the laser beam is corrected so as to have aberration corresponding to a numerical aperture of the objective lens and a thickness of the transparent layer of the optical disc. The laser beam that has passed through the spherical aberration correction mechanism 4 is reflected by the upstand mirror 5, and its propagating direction is changes so that its optical axis becomes perpendicular to the recording surface of the optical disc Ds. Then, the laser beam enters the quarter wave length plate 6. The laser beam entering the quarter wave length plate 6 is linear polarization light having a uniform polarizing direction and is converted into circular polarization light when it passes through the quarter wave length plate 6.

The laser beam that has passed through the quarter wave length plate 6 is condensed when it passes through the objective lens 7 and forms a laser spot on the recording surface of the optical disc Ds. The laser spot is formed by the laser beam that is condensed to be a circular shape having substantially the same diameter as a width of the track formed on the recording surface of the optical disc Ds. The laser beam projected onto the recording surface of the optical disc Ds to be a laser spot is reflected by the recording surface. A phase of the laser beam is shifted by a half wavelength when the laser beam is reflected by the recording surface.

The laser beam reflected by the recording surface of the optical disc Ds is converted into parallel rays when it passes through the objective lens 7, and it is converted from circular polarization into linear polarization when it passes through the quarter wave length plate 6. On this occasion, as for a polarizing direction of the laser beam that has passed through the quarter wave length plate 6, it is a laser beam having a polarizing direction in the direction perpendicular to the laser beam that has been emitted from the laser light source 1 and passed through the polarizing beam splitter 2. For instance, if the laser beam that has passed through the polarizing beam splitter 2 has a polarizing direction parallel to the paper sheet, the laser beam reflected by the optical disc Ds has a polarizing direction perpendicular to the paper sheet.

The laser beam that has passed through the quarter wave length plate 6 passes through the aberration correction mechanism 4 and then passes through the collimator lens 3. When passing through the collimator lens 3, the parallel rays as the laser beam are converted into converging light, which enters the polarizing beam splitter 2. Since the polarizing direction of the laser beam is perpendicular to the polarizing direction of the laser beam that has passed through the polarizing beam splitter 2, the laser beam that has been reflected by the optical disc Ds is reflected by the reflection plane 21 of the polarizing beam splitter 2 so that its propagating direction is bent by 90 degrees, and it enters the sensor lens 8. When the laser beam passes through the sensor lens 8, it is given astigmatic aberration and is projected to the photodetector 9. The photodetector 9 generates electric signals (e.g., a focus error signal, a tracking error signal and an information reproduction signal) based on the incident laser beam.

The electric signal generated by the photodetector 9 is sent to a control unit 10. The control unit 10 receives the electric signal, and based on the same it delivers a drive signal for moving a lens holder 11 for holding the objective lens in the tracking direction (the direction that is parallel to the recording surface of the optical disc and is perpendicular to the track) or in the focusing direction (the direction perpendicular to the recording surface of the optical disc) to a tracking coil 12 or a focusing coil 13 provided to the lens holder 11. In addition, based on the electric signal the control unit 10 also delivers a correction mechanism drive signal for driving the spherical aberration correction mechanism 4.

The spherical aberration correction mechanism 4 is driven based on the correction mechanism drive signal delivered from the control unit 10. On this occasion, a motor driving driver circuit 14 is disposed between the drive motor 450 and the control unit 10, and the motor driving driver circuit 14 delivers electric power for driving to the drive motor 450 in accordance with the correction mechanism drive signal.

The quantity of spherical aberration of the laser spot formed on the recording surface of the optical disc Ds is proportional to biquadrate of the NA of the objective lens 7 and is proportional to a thickness of the cover layer that is the transparent layer of the optical disc. The objective lens 7 has a very large NA of 0.85, so spherical aberration is apt to occur. If the spherical aberration occurs, the spot may be blurred and a spot diameter increases so that intensity of light at the center is decreased. If the spot diameter increases, it becomes difficult to form a laser spot accurately in a track of a small width and to read information recorded on the recording surface. In addition, if light intensity at the center decreases, it is difficult to record information. If the light intensity is increased, portions of large light intensity increases so that it becomes difficult to record information in a small area (track).

In addition, a cover layer of the optical disc Ds has a standardized thickness, but an actual thickness of the cover layer through which the laser beam passes is not uniform due to a manufacturing error or a wobbling of the disk. Therefore, in order to correct the spherical aberration of the laser beam entering the objective lens 7 so as to reduce influence of the spherical aberration to the laser spot formed on the recording surface, the spherical aberration correction mechanism 4 is provided. The spherical aberration correction mechanism 4 can correct quantity of spherical aberration of the laser beam within a predetermined range.

Figure 3:
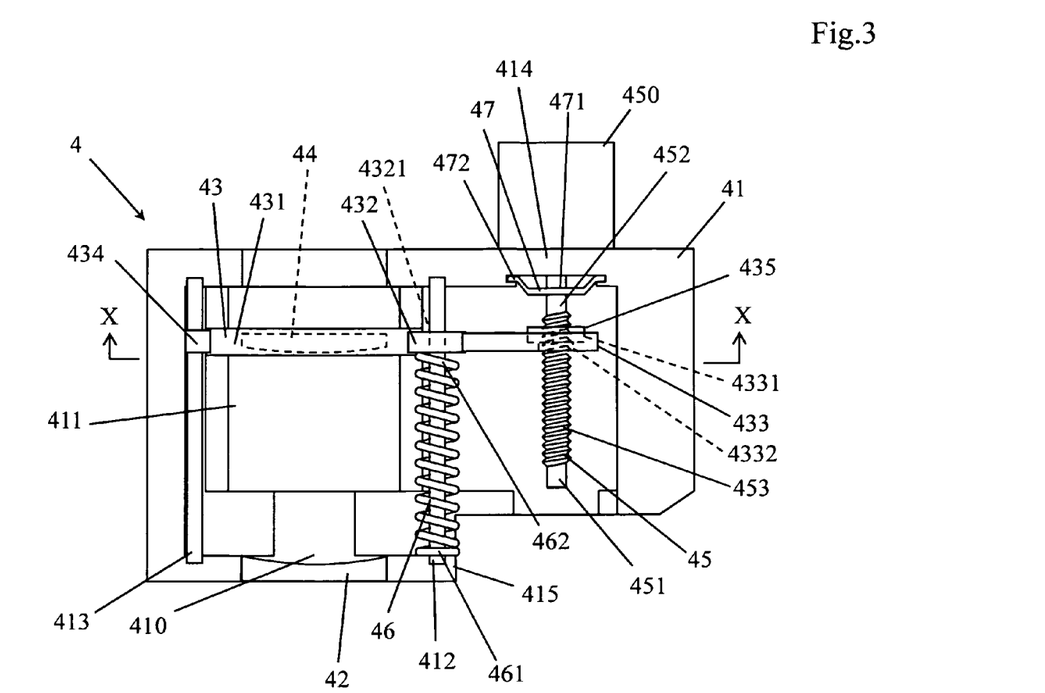
FIG. 3 is a plan view of the spherical aberration correction mechanism shown in FIG. 2.
Figure 4:
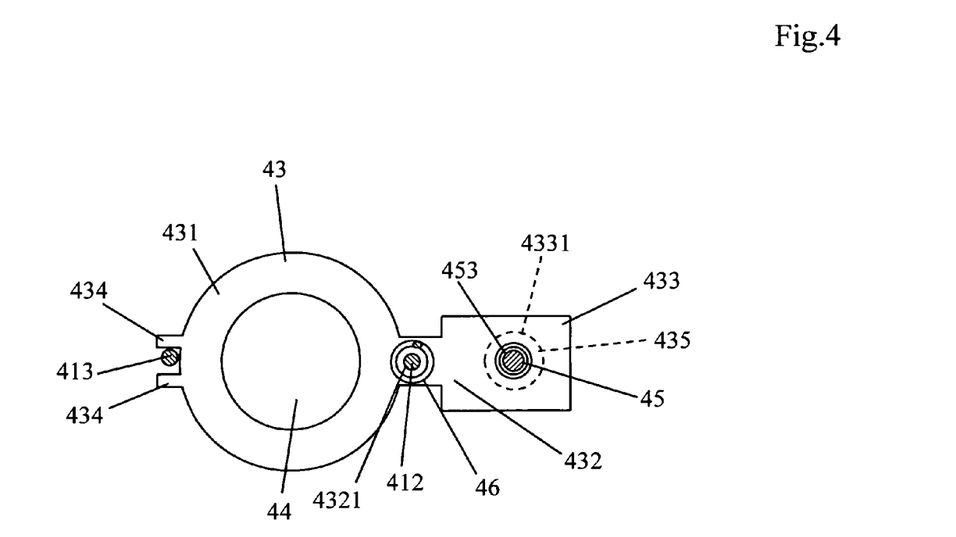
FIG. 4 is a cross section cut along the X-X line in FIG. 3 showing the spherical aberration correction mechanism.

Hereinafter, the spherical aberration correction mechanism 4 will be described in detail. FIG. 2 is a perspective view of a spherical aberration correction mechanism provided to the optical pickup according to the present invention, FIG. 3 is a plan view of the spherical aberration correction mechanism shown in FIG. 2, and FIG 4 is a cross section cut along the X-X line in FIG. 3 showing the spherical aberration correction mechanism. Note that a fixing portion and the drive motor are not shown in FIG. 4 for convenience sake.

As shown in FIGS. 2 and 3, the spherical aberration correction mechanism 4 includes at least a fixing portion 41, the aberration correction expanding lens 42, a movable portion 43, the aberration correction collimator lens 44, the feed screw 45, a coil spring 46 and a reset spring 47. In the spherical aberration correction mechanism 4, the laser beam passes through successively the aberration correction expanding lens 42 and the aberration correction collimator lens 44 between which a predetermined distance is set in accordance with the aberration correction quantity, so that the quantity of spherical aberration is corrected. The laser beam passes through the aberration correction collimator lens 44 after passing through the aberration correction expanding lens 42.

The fixing portion 41 is a frame manufactured by molding resin. The fixing portion 41 is fixed to a base member of the optical pickup (not shown). A laser beam passage 410 is formed in the fixing portion 41 for the laser beam that has passed through the collimator lens 3 to pass through. In addition, a lens sliding portion 411 is formed, which is a cylindrical concave groove having a curved surface sheared in the axial direction having a cross section larger than the laser beam passage 410 and is neighboring to the laser beam passage 410 of the fixing portion 41 in the axial direction.

The fixing portion 41 includes a cylindrical center shaft 412 and a side shaft 413 that are disposed with the laser beam passage 410 between them. The center shaft 412 and the side shaft 413 are disposed so as to be parallel with the optical axis of the laser beam that passes through the laser beam passage 410. In addition, as shown in FIG. 2, the coil spring 46 engages with the outer surface of the center shaft 412. Note that the coil spring 46 can be expanded or compressed in the axial direction of the center shaft 412.

In addition, the fixing portion 41 includes a support wall portion 414 supporting the feed screw 45 and a spring press wall portion 415 pressing the coil spring 46. The support wall portion 414 and the spring press wall portion 415 are perpendicular to the axial direction of the laser beam passage 410 and are disposed so as to align in the axial direction of the laser beam. The spring press wall portion 415 is disposed closer to the laser light source 1.

The aberration correction expanding lens 42 is fixed to the laser beam passage 410. The aberration correction expanding lens 42 is fixed to the laser beam passage 410 so that the laser beam passes through its center portion and that the center axis is parallel to the optical axis of the laser beam. A lens holding portion 431 of the movable portion 43, which will be described later, is disposed on the lens sliding portion 411 in a slidable manner.

As shown in FIG. 3 and the like, a first cylindrical portion 451 is formed on the tip of the feed screw 45, and a second cylindrical portion 452 having a similar shape to the first cylindrical portion 451 is formed on the tip of the feed screw 45 that is connected to the drive motor 450. In addition, the feed screw 45 has a helical groove 453 like a male thread formed on the outer surface at the middle portion in the axial direction.

As shown in FIG. 3 and the like, the feed screw 45 is parallel to the optical axis of the laser beam that passes through the laser beam passage 410 and is fixed to the fixing portion 41 in a rotatable manner on the opposite side to the laser beam passage 410 via the center shaft 412. The drive motor 450 is connected to the feed screw 45, and the drive motor 450 drives the feed screw 45 to rotate.

Note that the drive motor 450 may be connected directly to the feed screw 45 like the spherical aberration correction mechanism 4 shown in FIG. 3 or indirectly via a transmission mechanism such as a gear mechanism. in this example, the drive motor 450 is connected to an end of the feed screw 45, and the main body of the drive motor 450 is fixed to the support wall portion 414. Although motors that can be driven by electric power can be adopted widely as the drive motor 450, a stepping motor is adopted in this example. When a stepping motor is adopted as the drive motor 450, a rotation angle (number of rotation) of the feed screw 45 can be controlled accurately.

The movable portion 43 includes the lens holding portion 431 that holds the aberration correction collimator lens 44, a sliding portion 432 that engages with the center shaft 412 in a slidable manner and an engaging portion 433 disposed so as to contact with the feed screw 45. The movable portion 43 is a thin plate-like member.

As shown in FIG. 4, the movable portion 43 has the sliding portion 432 formed in the center portion, so that the lens holding portion 431 and the engaging portion 433 are formed integrally so as to sandwich the sliding portion 432. Note that the movable portion 43 is manufactured by molding resin having a good formability and high resistance to environmental change of heat or the like, e.g., liquid crystal polymer, polyphenylenesulfide (PPS) or the like as a unit.

An engaging portion 434 is formed on the side of the lens holding portion 431 opposite to the sliding portion 432 and engages loosely with the side shaft 413 of the fixing portion 41 in a slidable manner. The engaging portion 434 includes two protruding portions disposed in parallel with each other, and the side shaft 413 is disposed between the two protruding portions. The sliding portion 432 is provided with a sliding hole 4321 in which the center shaft 412 is inserted. When the center shaft 412 is inserted in the sliding hole 4321 of the sliding portion 432 and the engaging portion 434 engages with the side shaft 413, the movable portion 43 is supported by the center shaft 412 and the side shaft 413 that are disposed in parallel, so that it can be slide in the axial direction thereof. In addition, since the engaging portion 434 engages the side shaft 413, rotation of the movable portion 41 about the center shaft 412 can be controlled.

As shown in FIG. 4 and the like, the engaging portion 433 is provided with a recess 4331 having a dimension larger than the outer diameter of the feed screw 45 and a center axis that is parallel to the center axis of the feed screw 45, and a through hole 4332 penetrating from the bottom surface of the recess 4331 to the opposite side and having an inner diameter larger than the outer diameter of the feed screw 45. The recess 4331 is a cylindrical recess opening only to one face of the engaging portion 433. A lead nut 435 is pressed to fit in the recess 4331 and is fixed to the same.

The lead nut 435 has a cylindrical outer shape, and an engaging groove like a male thread that engages with the helical groove 453 of the feed screw 45 is formed on the inner surface of the lead nut 435. Although the lead nut 435 is pressed to fit in and is fixed so as not to be drawn out, the fixing method is not limited to the fit-in, but adhesive, adhesive tape or other adhesive member may be used for fixing. In addition, in order to prevent the lead nut 435 from rotating in accordance with rotation of the feed screw 45, a protruding portion (key) extending in the axial direction may be formed on the inner surface of the recess 4331 while a key groove may be formed on the lead nut 435 so that the key and the key groove are engaged with each other. Furthermore, the lead nut may be formed to have an outer shape like a polygonal column, so that rotation thereof can be prevented. It is preferable that the lead nut 435 is made of a resin having high sliding property with the feed screw 45. As a material having high sliding property, "Jurakon" resin, polyacetal resin or the like can be exemplified for instance. In addition, the lead nut 435 may be formed integrally with the engaging portion 433.

As shown in FIG. 2, the coil spring 46 is an elastic member made of elastic linear material (e.g., metal wire) that is wound like a helicoid. A first end portion 461 of the coil spring 46 contacts with the spring press wall portion 415 of the fixing portion 41, and a second end portion 462 of the same contacts with the sliding portion 432 of the movable portion 43. The coil spring 46 is disposed at the movable portion 43 on the side close to the aberration correction expanding lens 42 and presses the movable portion 43 in the direction separating from the aberration correction expanding lens 42.

When the engaging groove of the lead nut 435 and the helical groove of the feed screw 45 engage with each other, a constant gap is formed between the engaging groove and the helical groove due to the structure, so that a minute displacement in the axial direction (hereinafter referred to as a backlash) occurs. This backlash causes a displacement between the drive of the feed screw 45 and the slide of the lead nut 435 in the axial direction. Therefore, a repellent force of the coil spring 46 presses the movable portion 43 in the axial direction of the center shaft 412 so that the engaging groove of the lead nut 435 is pressed to the helical groove of the feed screw 45. Thus, occurrence of the backlash can be suppressed.

Figure 5:
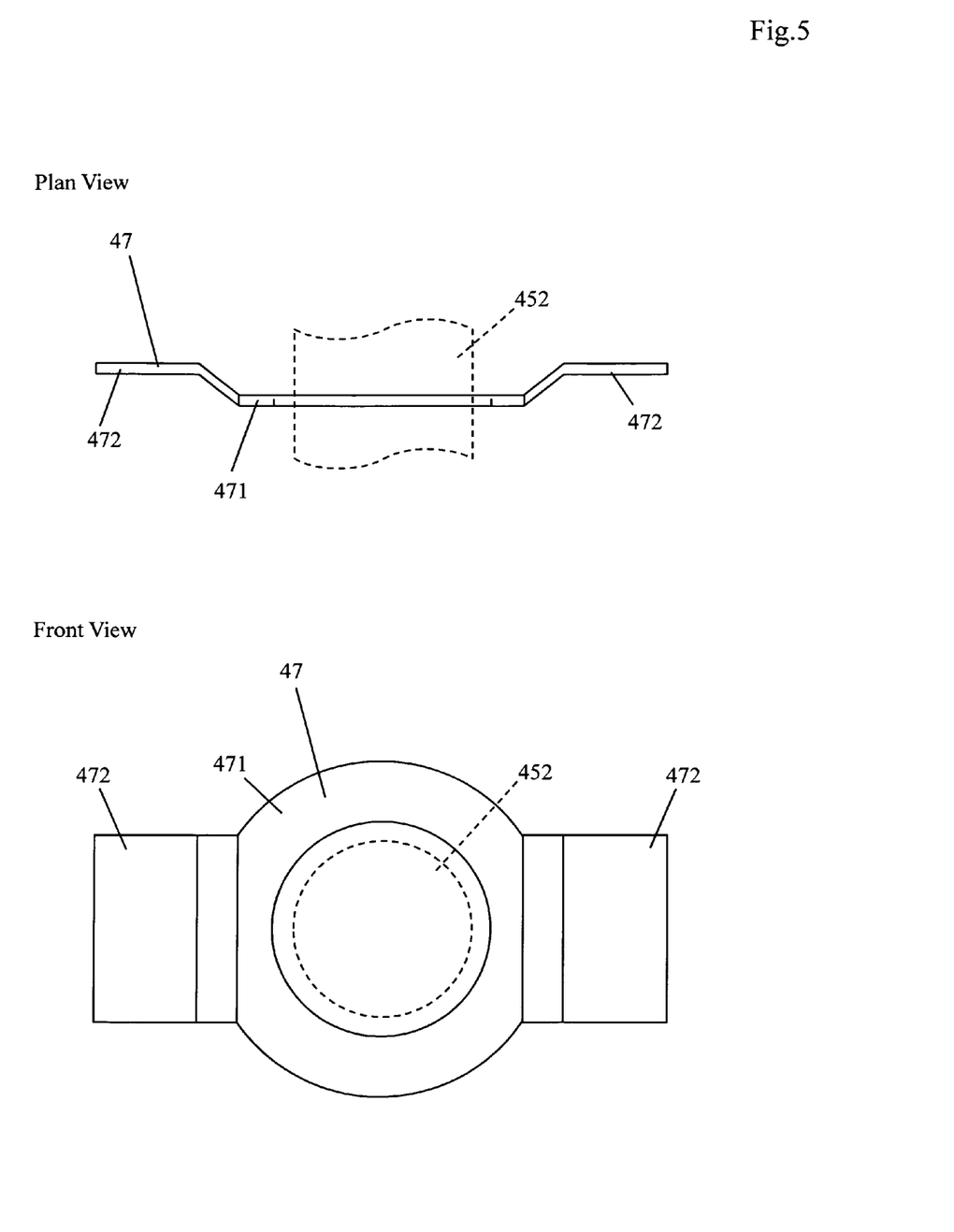
FIG. 5 shows a plan view and a front view of a reset spring that is used in the spherical aberration correction mechanism shown in FIG. 3.

The reset spring 47 is supported by the surface of the support wall portion 414 opposed to the spring press wall portion 415. FIG. 5 shows a plan view and a front view of the reset spring. As shown in FIG. 5, the reset spring 47 includes a toric portion 471 and an elastic portion 472 that is formed integrally with the toric portion 471 and extends in the normal direction being symmetric with respect to the center of the toric portion 471. A recess groove is formed in the support wall portion 414, and the feed screw 45 penetrates the through hole formed in the center of the toric portion 471 while the elastic portion 472 engages with the recess groove so that the reset spring 47 is supported by the engagement with the groove formed in the support wall portion 414. Further as shown in FIG. 5 by the broken line, the second cylindrical portion 452 of the feed screw 45 penetrates the center through hole of the toric portion 471.

Figure 6:
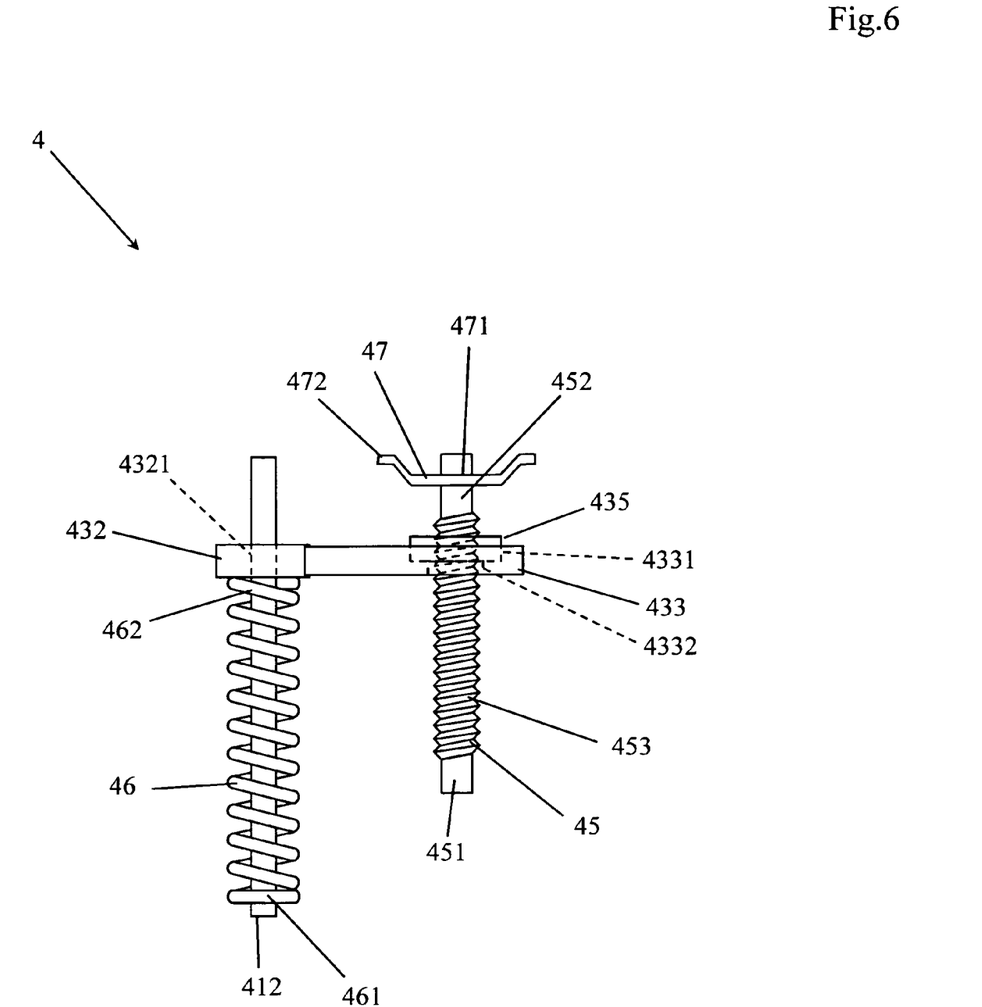
FIG. 6 is a plan view of the state where the spherical aberration correction mechanism according to the present invention is performing the aberration correction in the normal state.
Figure 7:
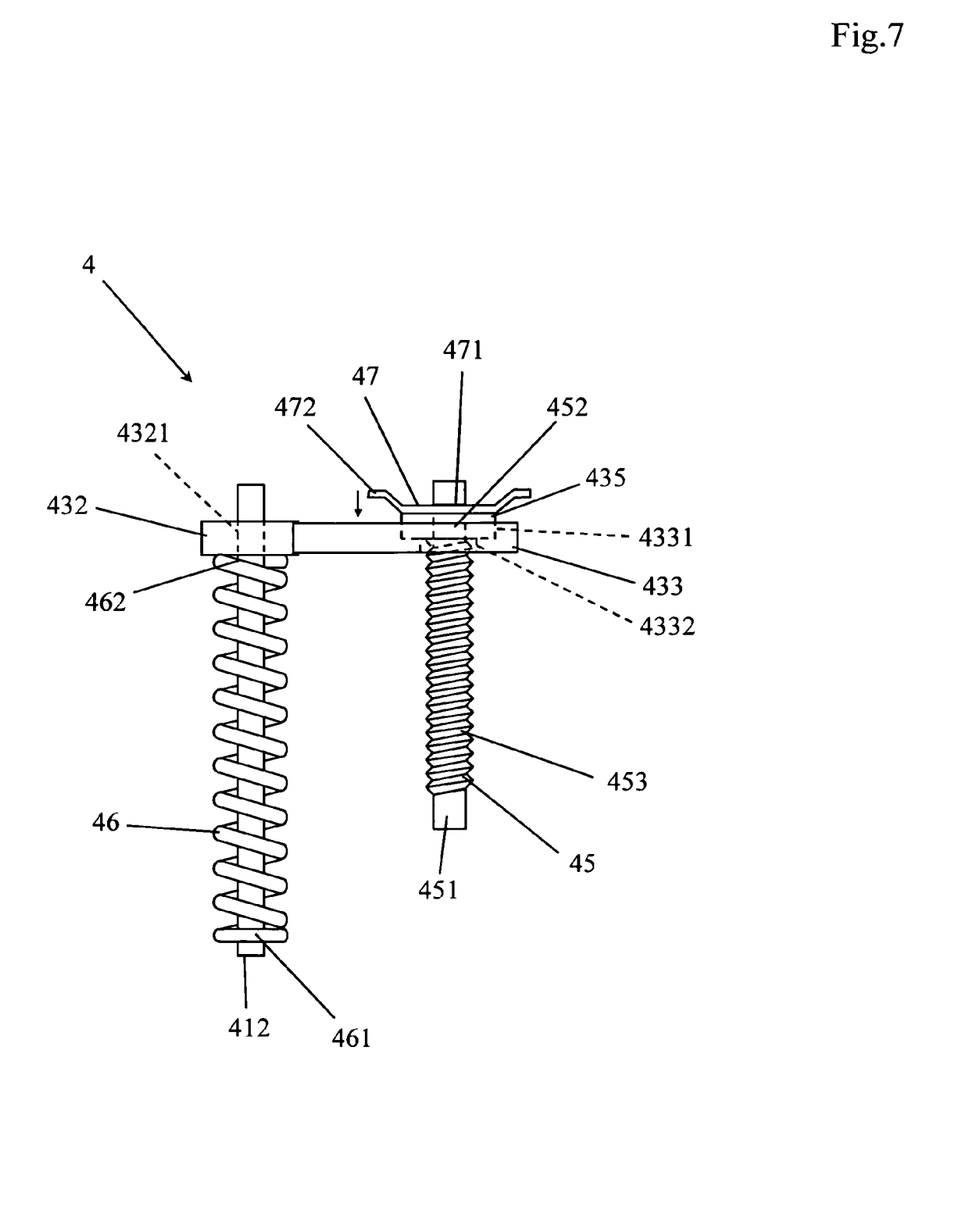
FIG. 7 is a plan view of the spherical aberration correction mechanism in the state where the lead nut reaches the second cylindrical portion.
Figure 8:
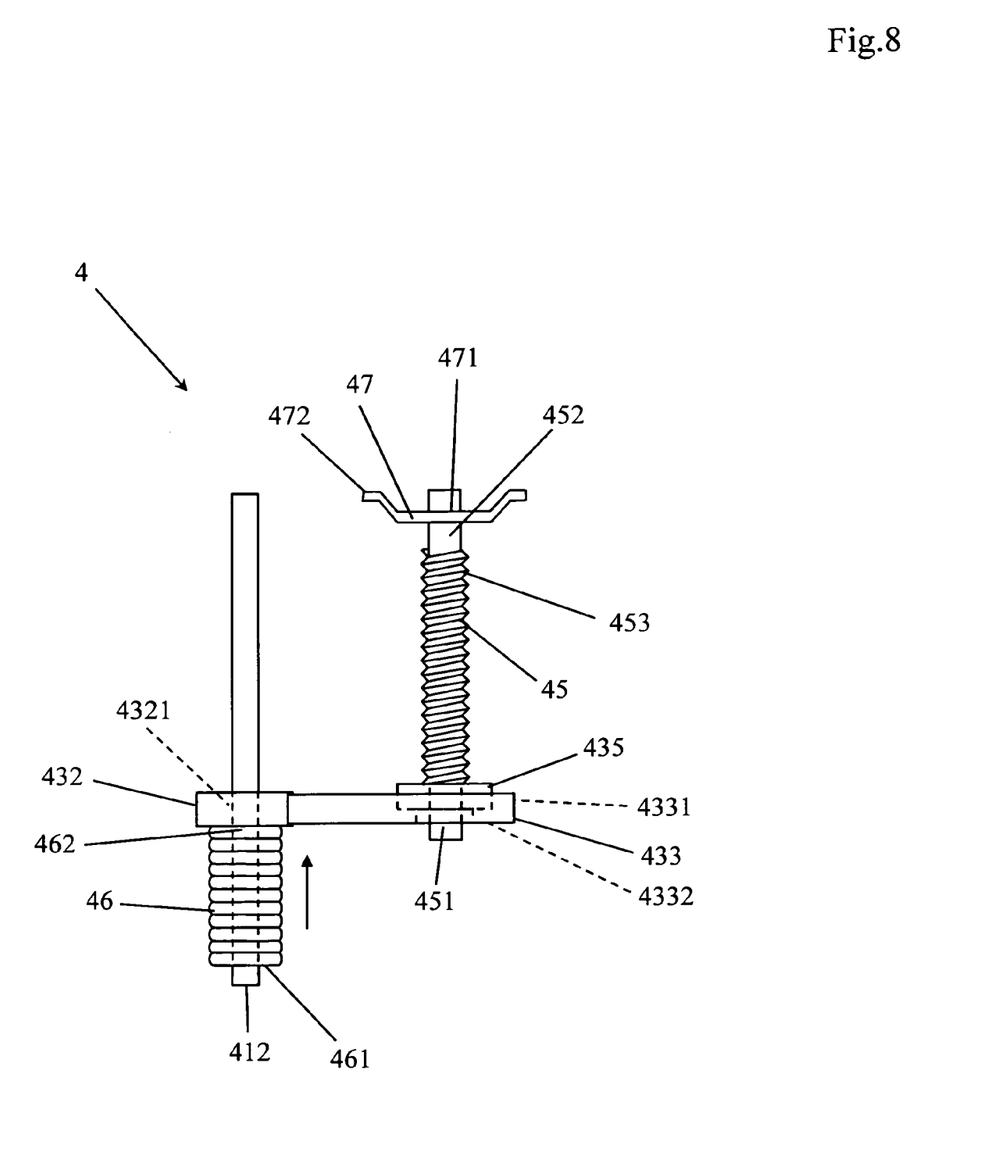
FIG. 8 is a plan view of the spherical aberration correction mechanism in the state where the lead nut reaches the first cylindrical portion.

Hereinafter, an operation of the spherical aberration correction mechanism 4 in the aberration correction will be described with reference to the drawings. FIGS. 6 to 8 show plan views of the spherical aberration correction mechanism in the aberration correction. The spherical aberration correction mechanism shown in FIGS. 6 to 8 includes the support wall portion 414, the spring press wall portion 415, the movable portion 43, the feed screw 45, the motor 450, the coil spring 46, the reset spring 47 and the lead nut 435 for convenience sake. Other members are not shown in the drawings.

FIG. 6 is a plan view of the spherical aberration correction mechanism of the present invention when it is performing the aberration correction in the normal state. As shown in FIG. 6, the engaging groove of the lead nut 435 and the helical groove 453 of the feed screw 45 engage with each other in the spherical aberration correction mechanism 4. When the drive motor 450 is driven in this state, the feed screw 45 is rotated so that the lead nut 435 is moved to slide in the axial direction of the feed screw 45. Thus, the engaging portion 433 to which the lead nut 435 is attached and the movable portion 43 with which the engaging portion 433 is formed integrally are moved to slide in the axial direction of the center shaft 412 (side shaft 413).

When the movable portion 43 slides in the axial direction of the center shaft 412 and the side shaft 413, the aberration correction collimator lens 44 is moved to slide in the optical axis direction of the laser beam. A distance between the aberration correction collimator lens 44 and the aberration correction expanding lens 42 can be changed while the positions (angles) thereof with respect to the optical axis of the laser beam are kept to be constant. The distance between the aberration correction expanding lens 42 and the aberration correction collimator lens 44 is adjusted to be a predetermined distance, and the laser beam passes through the aberration correction expanding lens 42 and the aberration correction collimator lens 44 successively so that the quantity of spherical aberration of the laser beam can be corrected. In other words, the aberration correction quantity of the laser beam can be adjusted when the feed screw 45 is rotated by an appropriate quantity (number of rotation or rotation angle).

Note that the sliding portion 432 is pressed by the elastic force of the coil spring 46 as shown in FIG. 6. In this way, occurrence of the backlash between the engaging groove of the lead nut 435 and the helical groove 453 of the feed screw 45 can be suppressed. Thus, since the rotation of the feed screw 45 can move the movable portion 43 to slide without delay, the distance between the aberration correction expanding lens 42 and the aberration correction collimator lens 44 can be adjusted promptly and accurately.

FIG. 7 is a plan view of the spherical aberration correction mechanism in the state where the lead nut has reached the second cylindrical portion. FIG. 7 shows the state where the engaging groove of the lead nut 435 of the movable portion 43 has reached the second cylindrical portion 452. When the feed screw 45 is rotated so that the lead nut 435 moves to the position closer to the drive motor 450 than the portion of the feed screw 45 where the helical groove 453 is formed, the drive motor 450 is controlled to stop so that the engagement between the helical groove 453 and the engaging groove of the lead nut 435 is not detached in the normal control state.

However, if the drive motor 450 is not stopped for a certain reason, the drive motor 450 is driven continuously after the lead nut 435 reaches the second cylindrical portion 452. Since the engaging groove of the lead nut 435 is detached from the helical groove 453, a seizing up state does not occur even if the drive motor 453 is driven continuously so that the feed screw 45 continues to rotate. Furthermore, in the state where the engaging groove of the lead nut 435 engages with the second cylindrical portion 452, the coil spring 46 has a natural length. In other words, the coil spring 46 is in the state of not pressing the sliding portion 432.

In addition, when the lead nut 435 reaches the second cylindrical portion 452, the lead nut 435 pressed the reset spring 47. The reset spring 47 is pressed and is deformed, so that the lead nut 435 is pressed toward the helical groove 453 by the repellent force of the reset spring 47. When the lead nut 435 is reset to be in the normal state again after it stops on the second cylindrical portion 452, the repellent force of the reset spring 47 makes the lead nut 435 be pressed to the helical groove 453 of the feed screw 45 while the drive motor 450 is driven, so that the engaging groove of the lead nut 435 and the helical groove 453 are engaged with each other. Thus, the movable portion 43 is reset to be the slidable state. Since the movable portion 43 is reset to be the slidable state, the correction of the spherical aberration can be restarted smoothly.

Note that it is possible to perform the initialization operation for confirming a position of the lead nut 435 on the helical groove 453 after the movable portion 43 is reset to be the slidable state. If the initialization operation is performed in this way, the operation of the drive motor 450 can be associated with the distance between the aberration correction expanding lens 42 and the aberration correction collimator lens 44 so that the adjustment of the aberration correction quantity can be performed accurately.

The above example describes the case where the coil spring 46 does not exert the elastic force. If the coil spring 46 exerts the elastic force (i.e., in the state having a length shorter than the natural length), however, the elastic force of the reset spring 47 should be adjusted to be larger than the elastic force of the coil spring 46.

Furthermore, FIG. 8 is a plan view of the spherical aberration correction mechanism in the state where the lead nut has reached the first cylindrical portion. FIG. 8 shows the state where the engaging groove of the lead nut 435 of the movable portion 43 has reached the first cylindrical portion 451. When the feed screw 45 is rotated so that the lead nut 435 moves to the position opposite to the drive motor 450 from the portion of the feed screw 45 where the helical groove 453 is formed, the drive motor 450 is controlled to stop so that the engagement between the helical groove 453 and the engaging groove of the lead nut 435 is not detached in the normal control state. However, if a certain error prevents the drive from being stopped, the drive motor 450 is driven continuously after the lead nut 435 reaches the first cylindrical portion 451. Since the engaging groove of the lead nut 435 is separated from the helical groove 453, the seizing up does not occur even if the drive motor 450 is driven continuously so that the feed screw 45 continues to rotate.

In addition, when the lead nut 435 reaches the first cylindrical portion 451, the lead nut 435 is always pressed by the coil spring 46 so that the lead nut 435 is pressed toward the helical groove 453 by the pressing force of the coil spring 46. After the lead nut 435 is reset to be the normal state again after it moves to the second cylindrical portion 452 and stops, the lead nut 435 is pressed to the helical groove 453 of the feed screw 45. Thus, the engaging groove of the lead nut 435 engages with the helical groove 453 so that the correction of the spherical aberration can be restarted smoothly.

According to this structure, when the movable portion 43 reaches each end portion of its movable range, in other words, the engagement between the engaging groove of the lead nut 435 and the helical groove 453 is detached so that the movable portion 43 reaches the first cylindrical portion 451 or the second cylindrical portion 452, after the spherical aberration correction mechanism 4 is stopped, the lead nut 435 is pressed to the helical groove 453 by the pressing force of the coil spring 46 or the repellent force of the reset spring 47. After that, the drive motor 450 restarts to drive so that the engaging groove of the lead nut 435 engages with the helical groove 453 of the feed screw 45 again and can be reset to the normal operation automatically.

Using the spherical aberration correction mechanism 4, it is possible to suppress occurrence of the seizing up between the engaging groove of the lead nut 435 and the helical groove 453 of the feed screw 45. In addition, since the movable portion is reset to be the normal operation automatically after it moves beyond its movable range, reliability of the optical pickup can be improved.

Figure 9:
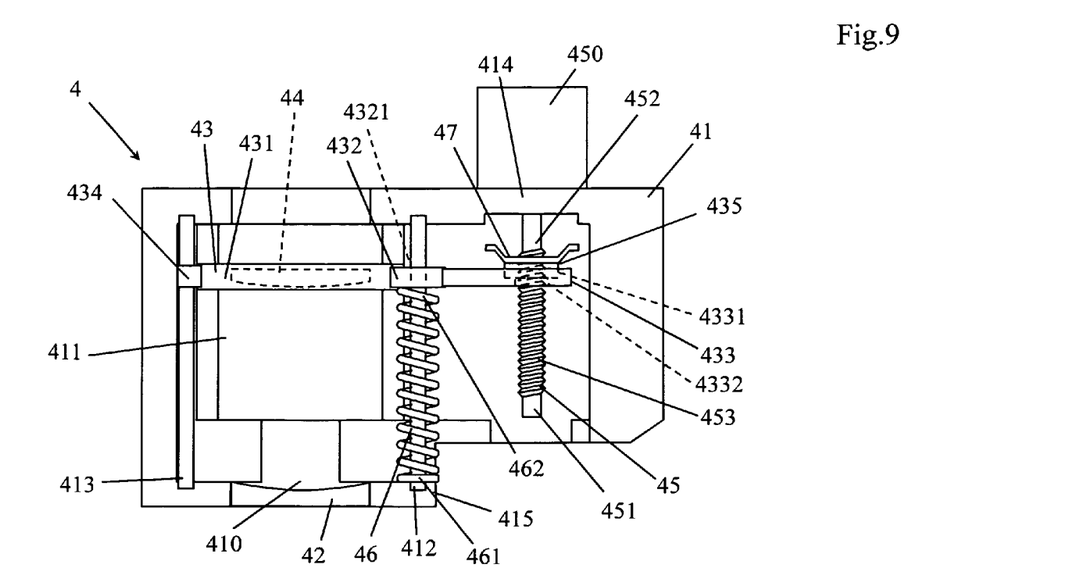
FIG. 9 is a plan view of another example of the spherical aberration correction mechanism provided to the optical pickup according to the present invention.

Although the spherical aberration correction mechanism 4 described above has the reset spring 47 supported by the support wall portion 414 of the fixing portion 41, this is not the limitation. As shown in FIG. 9, the reset spring 47 may be fixed to the lead nut 435. Alternatively, the reset spring 47 may be attached to the engaging portion 433 or to the sliding portion 432.

Figure 10:
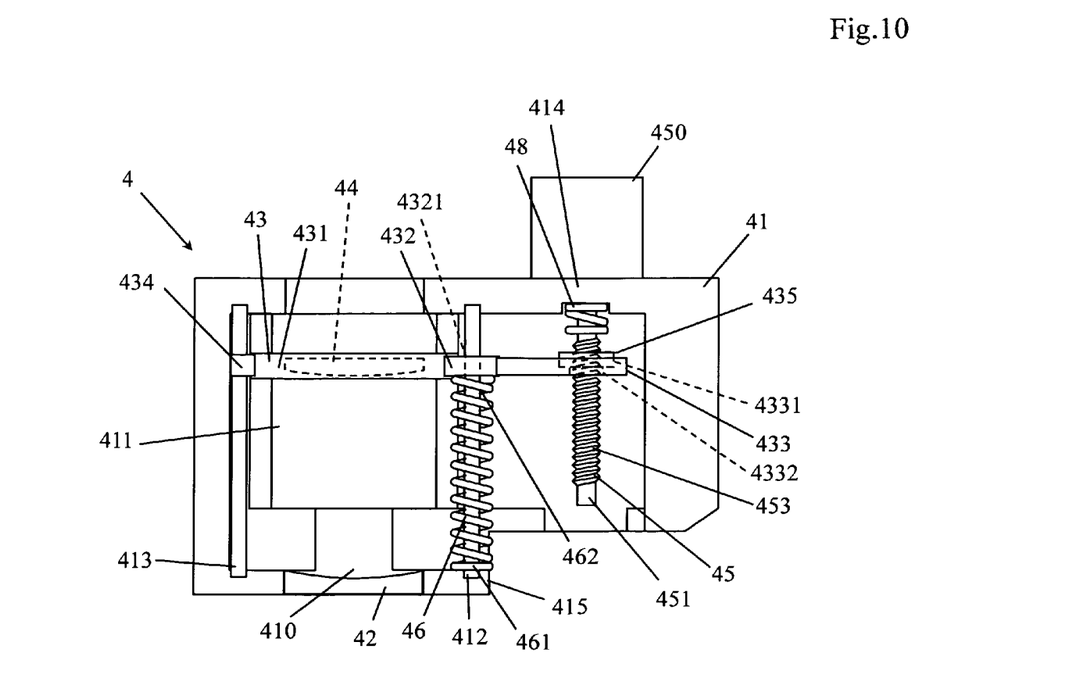
FIG. 10 is a plan view of another example of the spherical aberration correction mechanism provided to the optical pickup according to the present invention.

In addition, although the spherical aberration correction mechanism 4 described above uses the leaf spring as the reset spring 47, this is not the limitation. It is possible to use other elastic member that can press back the lead nut 435 in the axial direction after the lead nut 435 reaches the limit of its movable range (i.e., the second cylindrical portion 452). This elastic member may be one like a coil spring 48 shown in FIG. 10 or one utilizing a magnetic repellent force, for instance. It is preferable to have a light weight and have a small size. The coil spring 48 may be attached to the lead nut 435.

In addition, although the spherical aberration correction mechanism 4 described above exemplifies the structure in which the reset spring 47 presses the lead nut 435, it may have another structure similar to the coil spring 46, in which it is engaged with the center shaft 412 so as to press the surface of the sliding portion 423 opposite to the surface pressed by the coil spring 46.

In the example described above, it is possible to fix the first end portion 461 of the coil spring 46 to the spring press wall portion 415 of the fixing portion 41 and to fix the second end portion 462 of the same to the sliding portion 432 of the movable portion 43, so as to press the movable portion 43 in the expanding direction when the coil spring 46 is shorter than the natural length and to press the same in the contracting direction when the coil spring 46 is longer than the natural length. In this case, the coil spring for suppressing the backlash and the reset spring can be realized as one spring. Note that a length of the coil spring 46 is determined so that the engaging groove of the lead nut 435 and the helical groove of the feed screw 45 can engage with each other when the coil spring 46 is in the natural length.

Although the above-mentioned example exemplifies one that is used for the optical pickup used for the optical disc apparatus that records or reproduce information by using a blue violet laser, this is not the limitation. For instance, the present invention can be applied also to an optical pickup that uses a red laser for projecting a laser beam to an optical disc having two layers so as to record or reproduce information, or an optical pickup that uses a blue violet laser, a red laser and an infrared laser for supporting recording or reproducing information on a plurality of types of optical discs (e.g., a BD medium, a DVD medium and a CD medium).

Although the spherical aberration correction mechanism 4 described above has the structure in which the aberration correction collimator lens 44 is supported by the movable portion 43 so as to slide, it may have a structure in which the aberration correction expanding lens 42 moves to slide. In addition, although the spherical aberration correction mechanism 4 described above exemplifies the structure having one aberration correction expanding lens 42 and one aberration correction collimator lens 44 each, it may have more lenses for correcting the aberration. In this case, it also has a function of correcting aberration other than the spherical aberration.

Although the above-mentioned optical pickup A has the spherical aberration correction mechanism 4 disposed between the collimator lens 3 and the upstand mirror 5, this arrangement is not the limitation. Other arrangements can be adopted widely as long as accuracy of the laser beam projection is not degraded.

Although the embodiment of the present invention is described above concretely, the present invention is not limited to the embodiment described above, which can be modified variously within the scope of the present invention without deviating from the spirit thereof.

The present invention can be applied to optical pickups that need correction of spherical aberration.

What is claimed is:

1. An optical pickup capable of correcting spherical aberration, comprising:
    an objective lens for condensing a light beam emitted from a light source onto a recording surface of an information recording medium;
    a plurality of aberration correction lenses for correcting spherical aberration of the light beam condensed onto the recording surface by the objective lens;
    a movable portion for supporting at least one of the aberration correction lenses;
    a fixed portion for supporting the aberration correction lens other than the one supported by the movable portion, the movable portion being disposed in the fixed portion in a slidable manner;
    a shaft disposed in parallel with the optical axis of the aberration correction lens in the fixed portion for supporting the movable portion in a rotatable manner about the axis and in a slidable manner in the direction of the axis of the shaft;
    a feed screw having a helical groove, disposed in parallel with the optical axis of the plurality of aberration correction lenses;
    an engaging portion disposed in the movable portion, having an engaging groove like a male thread engaging with the helical groove of the feed screw; and
    a coil spring engaging with the outer surface of the shaft, for pressing the movable portion in the direction of the axis of the shaft, wherein
    each end portion of the feed screw is provided with a cylindrical portion having an outer diameter smaller than an inner diameter of the feed screw, and
    a resetting elastic portion supported by the fixed portion or the movable portion is provided for pressing the movable portion in the direction opposite to the pressing direction of the coil spring.

2. The optical pickup according to claim 1, wherein when the engaging groove of the engaging portion reaches the cylindrical portion formed at the end portion of the shaft on the side of a pressing direction by the coil spring, the resetting elastic portion presses the movable portion.

3. The optical pickup according to claim 1, wherein the resetting elastic portion is supported by the fixed portion.

4. The optical pickup according to claim 2, wherein the resetting elastic portion is supported by the fixed portion.

5. The optical pickup according to claim 1, wherein the resetting elastic portion is supported by the engaging portion.

6. The optical pickup according to claim 2, wherein the resetting elastic portion is supported by the engaging portion.

7. The optical pickup according to claim 1, wherein the engaging portion includes a through hole that the feed screw penetrates in a noncontact manner and a lead nut fixed to the engaging portion, and the lead nut has an engaging groove like a male thread engaging with a helical groove of the feed screw.

8. The optical pickup according to claim 4, wherein the engaging portion includes a through hole that the feed screw penetrates in a noncontact manner and a lead nut fixed to the engaging portion, and the lead nut has an engaging groove like a male thread engaging with a helical groove of the feed screw.

9. The optical pickup according to claim 6, wherein the engaging portion includes a through hole that the feed screw penetrates in a noncontact manner and a lead nut fixed to the engaging portion, and the lead nut has an engaging groove like a male thread engaging with a helical groove of the feed screw.

10. The optical pickup according to claim 1, wherein the resetting elastic portion is a leaf spring.

11. The optical pickup according to claim 4, wherein the resetting elastic portion is a leaf spring.

12. The optical pickup according to claim 6, wherein the resetting elastic portion is a leaf spring.

13. The optical pickup according to claim 9, wherein the resetting elastic portion is a leaf spring.

14. The optical pickup according to claim 1, wherein the resetting elastic portion is a coil spring.

15. The optical pickup according to claim 4, wherein the resetting elastic portion is a coil spring.

16. The optical pickup according to claim 6, wherein the resetting elastic portion is a coil spring.

17. The optical pickup according to claim 9, wherein the resetting elastic portion is a coil spring.

18. The optical pickup according to claim 1, wherein the feed screw penetrates the middle of the resetting elastic portion, which presses the engaging portion.

19. The optical pickup according to claim 4, wherein the feed screw penetrates the middle of the resetting elastic portion, which presses the engaging portion.

20. The optical pickup according to claim 6, wherein the feed screw penetrates the middle of the resetting elastic portion, which presses the engaging portion.

21. The optical pickup according to claim 9, wherein the feed screw penetrates the middle of the resetting elastic portion, which presses the engaging portion.

22. The optical pickup according to claim 13, wherein the feed screw penetrates the middle of the resetting elastic portion, which presses the engaging portion.

23. The optical pickup according to claim 17, wherein the feed screw penetrates the middle of the resetting elastic portion, which presses the engaging portion.

* * * * *